May 6, 1930.  W. B. KLEMPERER  1,757,933
TENSIOMETER
Filed June 12, 1928  2 Sheets-Sheet 1
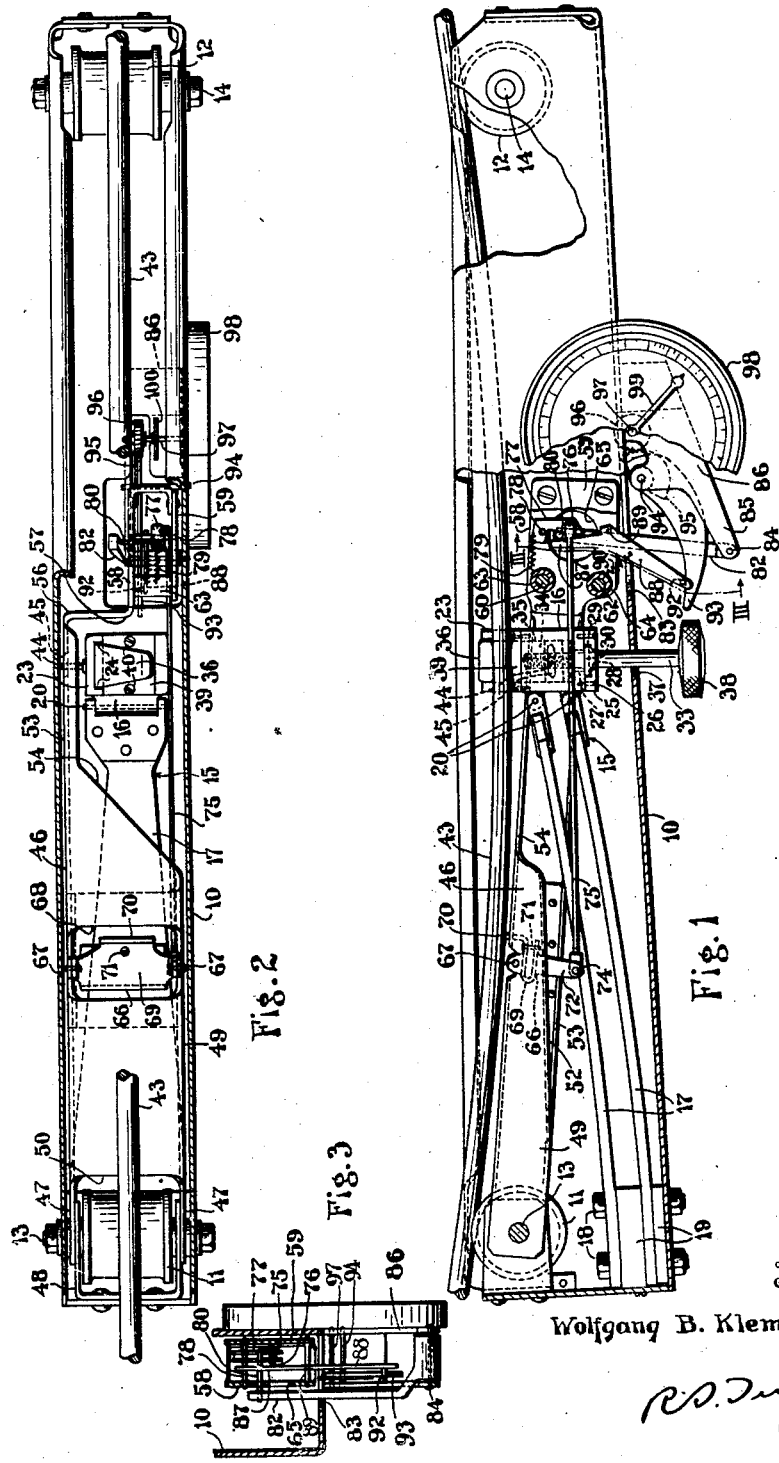
Inventor
Wolfgang B. Klemperer May 6, 1930.  W. B. KLEMPERER  1,757,933
TENSIOMETER
Filed June 12, 1928  2 Sheets-Sheet 2

Inventor
Wolfgang B. Klemperer
By
Attorney

Patented May 6, 1930

1,757,933

UNITED STATES PATENT OFFICE

WOLFGANG B. KLEMPERER, OF AKRON, OHIO, ASSIGNOR TO GOODYEAR-ZEPPELIN CORPORATION, OF AKRON, OHIO, A CORPORATION OF DELAWARE

TENSIOMETER

Application filed June 12, 1928. Serial No. 284,827.

This invention relates to force measuring devices and has particular relation to an instrument commonly known as a tensiometer for measuring tensional forces acting upon taut wires, cables and like members.

The object of the invention is to provide an instrument for measuring and indicating tensional forces in taut wires or cables of various sizes and stiffness by mechanically compensating for the relative size and stiffness of such wires or cables without resorting to the use of charts or tables for making corrections of discrepancies caused by the nature of the material of which the wires, etc., are composed.

Tensiometers of the type previously constructed were inadequate for measuring accurately the tensional forces in wires of relatively large cross-section because no consideration was directed to mechanical means of compensating for the stiffness of the wire. Usually figures indicating tensional forces recorded according to these instruments were required to be corrected by calculations based upon figures taken from charts or tables representing the known characteristics of the wire, such as the kind of material of which it was composed, its shape and its cross-sectional size.

According to the operation of an instrument embodying this invention, the actual tension in stiff wires composed of any material within a relatively wide range of shape and size can be measured upon a single dial graduation sufficiently accurately for all practical purposes.

This instrument operates by deflecting the tensioned member and it is equipped with a compensating device which corrects, with reasonable accuracy, the readings as compared with readings taken from conventional tensiometers. A wire, whose tension is to be measured, rests against two spaced supports and resilient mechanism applies a force to the wire intermediately of the supports in such manner that the wire is deflected therebetween. Since the wire is relatively stiff, the portions thereof between the spring mechanism and the points of contact with the supports do not define straight lines, but there is a secondary camber or curvature adjacent each point of contact that would not be appreciably noticeable in a very small wire or thread under the same conditions. The device for measuring and compensating for the secondary camber of the intermediate portions of the deflected wire is incorporated into the instrument in such manner that the effect of the wire's stiffness is obviated.

For a better understanding of the invention, reference may now be had to the accompanying drawings, forming a part of the specification, of which:

Fig. 1 is an elevational view of a tensiometer embodying the invention, parts of the frame thereof being broken away in order to show the operating elements;

Fig. 2 is a plan view of the tensiometer with parts of the frame removed;

Fig. 3 is a cross-sectional view taken substantially along the line III—III of Fig. 1.

Figure 4:
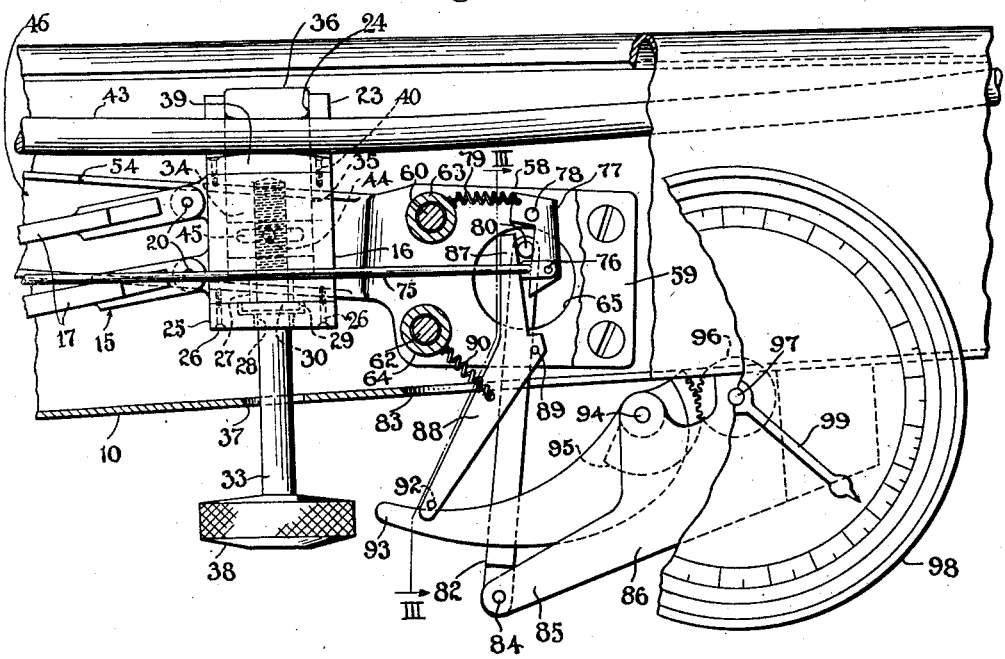
Fig. 4 is a fragmentary elevational view, on a larger scale, of the central portion of the tensiometer.

Referring to Fig. 1, the tensiometer comprises a frame 10 having rollers 11 and 12 journaled adjacent the opposite ends thereof upon bolts 13 and 14. A deflecting mechanism 15, which includes a hollow deflector or head 16 and a pair of calibrated leaf springs 17, is rigidly secured adjacent one end of the frame by means of bolts 18 extending through the ends of the springs and through spacing blocks 19. Spaced pins 20 provide pivotal connections between the head and the springs 17.

One end portion of the hollow head 16 is in the form of a relatively shallow channeled projection 23 having converging inner surfaces 24 (Fig. 1) which serve as guides, while the other end is provided with a plate 25 that is rigidly secured thereto, as indicated at 26. An opening 27 formed in the lower wall of the deflector registers with a similar opening 28 in the plate and a relatively large annular recess 29 in the face of the plate 25 adjacent the end surface of the head rotatably confines an annular shoulder 30 of a thumb screw 33. This construction permits the thumb screw to be rotated but prevents axial movement thereof within the recess 29.

One end portion of the thumb screw is threaded through a lug 34 at one end of a clamping device 35 that is slidably, but not rotatably, mounted within the guides 24. The other end of the clamping device is provided with a lug or hook 36, while the other end portion of the thumb screw projects through an opening 37 in the frame and it is provided with a knob 38 to facilitate manual rotation thereof. A plate 39, secured, as indicated at 40, across the deflector at the base of the projection 23, serves as a stop for the lug 34 during the outward movement of the clamping device 35, and as a stop or abutment against which a wire or other tensioned member 43 is clamped by the hook 36 when the clamping device is moved inwardly.

A relatively short pin 44 is rigidly secured to an intermediate portion of the deflector and extends outwardly therefrom into a slot 45 formed adjacent one end of a partially channeled arm 46 that is provided with a pair of spaced ears 47 pivotally mounted upon the bolt 13. These ears are separated from the roller 11 by means of a bracket 48 of U-shape that is bolted to the frame 10 and through which the bolt 13 extends. When the deflector 16 and the arm 46 are moved together, the slot 45 provides sufficient space for lateral play to prevent the members for locking.

One end portion 49 of the arm 46 is channeled and is provided with a pair of side flanges or legs 52 and 53 and an upper wall 50 defining the base of the channel. This wall terminates at an intermediate portion of the arm and is provided with an open space 54 through which the deflector 16 projects. One flange 53 of the channeled arm that contains the slot 45 continues in a plane at right angles to the wall 50 beyond the deflector and is then bent, as indicated at 56 and 57. The end portion of the arm 43 beyond the bent portions includes two spaced rectangular walls 58 and 59, the latter of which is in the form of a plate and disposed in a plane at the opposite side of the deflector from the pin 44. Ordinary bolts 60 and 62, having spacing sleeves 63 and 64 thereon, maintain the walls in spaced parallel relation and a relatively large opening 65 is formed in the wall 58.

One of the most important features of the invention includes a lever 66 having pivotal connections 67 to the legs of the channeled arm 46 disposed adjacent an opening 68 in an intermediate portion thereof and is provided with a slightly resilient portion 69 of U-shape that has a finger or offset projection 70 extending through the opening. A screw or threaded bolt 71 is threaded through one leg of the U-shape member and is rotatably mounted in the other, thereby providing means for varying the distance between the legs to adjust the transmission ratio of the lever 66. A relatively long arm 72 of the lever, extending beyond the legs of the channeled arm, is connected at its end, as indicated at 74, to one end of a rod 75. The other end of the rod 75 is pivotally connected, as indicated at 76, adjacent one end of a lever 77 that is secured upon a pin 78 journaled transversely in the walls 57 and 58. In order to provide a force constantly tending to rotate the lever 77 about its journal bearing in a counterclockwise direction, as viewed in Figs. 1 and 4, a fine tensional spring 79 is connected to the end thereof opposite the end containing the connection 76 and to the spacing sleeve 63.

An intermediate portion of the lever 77 between the connections 76 and 78 bears against a pin 80 which extends through the opening 65 and is rigidly secured to one end of a link 82. The other end of the link extends outwardly through an opening 83 in the frame and has a pivotal connection 84 to an arm 85 of a housing 86, that is rigidly secured to the frame 10. One end portion 87 of a lever 88 also engages the pin 80 at a point on the opposite side thereof from the point of engagement of the lever 77 therewith, and an intermediate portion of the lever 88 has a journal bearing 89 in the walls 58 and 59 of the arm. A fine tensional spring 90, attached to the spacing sleeve 64 and to the lever 88, constantly tends to pivot the latter in a clockwise direction, as viewed in Figs. 1 and 4. The other end of the lever 88 extends through the opening 83 and is provided with a pin 92 rigidly secured at right angles thereto which slidably engages the surface of an elongate cam 93. One end of the cam, that has a pivotal connection 94 to the housing 86, is provided with a segmental gear 95 rigidly secured thereto and rotatable, together with the cam, about its axial connection 94. A second gear 96, meshing with the gear 95, is rigidly secured to a pin 97 that is journaled in the wall of the housing 86 and in the wall of a dial 98. One end of the pin 97 is provided with an indicator or pointer 99 and an intermediate portion thereof is provided with a hair spring 100 (Fig. 2) which constantly maintains the cam 93 in contact with the pin 92. The dial 98 is graduated in terms of tensional force acting upon the wire to be measured. The graduation divisions are determined by calculation based on calibration of the springs 17 and can be checked by calibration of the assembled instrument when applied to wires or cables subjected to tension measured independently.

In the normal position of the device the points 78, 80 and 89 are disposed in approximately a straight line. Also, the pin 80 is disposed at a point intermediate the points 76 and 78 and the link 82 is disposed approximately perpendicular to the wire when the latter normally engages the rollers 11 and 12.

Before applying the instrument to the wire 43, whose tension is to be measured, the thumb screw 33 is so rotated as to move the clamping hook 36 outwardly until the abutment 34 is stopped against the plate 39. In applying the instrument, it is manually so positioned that the rollers 11 and 12 engage the wire 43 and by pressing the palm of the hand against the knob 38 the deflector 16 is moved outwardly until the hook 36 can be slipped over the wire. Upon releasing the knob, the springs 17, tending to assume their original position, will draw and deflect an intermediate portion of the wire between the supports 11 and 12 toward the interior of the frame. The thumb screw 33 is then rotated to draw the clamping hook 36, together with the wire, inwardly toward the abutment 39. During this latter operation, the indicator or pointer 99 rotates in a counter-clockwise direction, as viewed in Fig. 1, until the wire engages the finger 70. At that moment the indicator ceases to rotate in a counterclockwise direction and begins to rotate in a clockwise direction until the wire is clamped snugly between the hook 36 and the abutment 39. Further rotation of the thumb-screw cannot be effected and the pointer in this relation of the elements indicates upon the dial the true tensional force in the wire, regardless of the stiffness thereof.

From the foregoing description, it will be apparent that this instrument is particularly applicable and valuable as a labor and time saving device where it is necessary to determine the tension in taut wires or like tensional members.

Although I have illustrated but the preferred form which the invention may assume and have described that form in detail, it will be apparent to those skilled in the art that the invention is not so limited but that various minor modifications may be made therein without departing from the spirit of the invention or from the scope of the appended claims.

What I claim is:

1. A device for measuring forces acting upon a tensioned member comprising supporting means for engaging the tensioned member, a resilient mechanism supported by said means for engaging and deflecting the tensioned member, an indicator actuated by the engagement of the mechanism with the deflected tensioned member and means having connections to the supporting means for compensating for relative stiffness of the tensioned member.

2. A device for measuring forces acting upon a tensioned member comprising a yieldable mechanism for engaging and deflecting the tensioned member, and an indicator provided with means for engaging the tensioned member at a plurality of points along the deflected portion thereof.

3. A device for measuring forces acting upon a tensioned member comprising a frame having an indicator mounted thereon, a resilient deflecting mechanism carried by the frame for engaging the tensioned member and an element having an operative connection to the latter and having correlated connections to the deflecting mechanism and to the indicator serving to compensate for the stiffness of the tensioned member.

4. A device for measuring forces acting upon a tensioned member comprising a pair of spaced supports for engaging the tensioned member, resilient means intermediate the supports for engaging and deflecting an intermediate portion of the tensioned member, a compensator connected thereto for influencing the effect of the stiffness of the tensioned member upon the resilient means, said compensator including an element actuated by the intermediate cambered portion of the tensioned member between the point of engagement of the resilient means therewith and one of the supports, and an indicator having gearing operatively connected to the resilient means and to the element.

5. A device for measuring forces acting upon a tensioned member comprising a yieldable mechanism for engaging and deflecting a portion of the tensioned member, an indicator operatively connected to the yieldable mechanism, a movable element for engaging the tensioned member at a point spaced from the point of the engagement of the latter with the yieldable mechanism, said element having correlated connections to the indicator and to the yieldable mechanism whereby the stiffness of the tensioned member is compensated.

6. A device for measuring forces acting upon a tensioned member comprising a frame having spaced rotatable supports thereon for guiding the tensioned member, a deflector resiliently secured to the frame and provided with a member for clamping the tensioned member, an arm pivotally mounted about the axis of one of the rotatable supports, means for transmitting movement from the deflector to the arm, an indicator having gearing operatively connected to the arm and a device having correlated connections to the arm and to the gearing to compensate for stiffness of the tensioned member.

7. A device for measuring forces acting upon a tensioned member comprising a frame having a pair of spaced rotatable members for engaging two points on the tensioned member, a deflector resiliently mounted upon the frame to engage, and to produce a camber in, the tensioned member between the rotatable members, a lever movable by the tensioned member mounted intermediate the deflector and one of the rotatable members for measuring the secondary camber of the tensioned member between said deflector and the last mentioned rotatable member, and a dial indicator having a gearing responsive to movement of the deflector and the lever to indicate the tension in the tensioned member regardless of its stiffness.

8. A device for measuring forces acting upon a tensioned member comprising a frame provided with a pair of spaced rotatable supports for engaging two points on the tensioned member, an arm pivoted to the frame adjacent one of the rotable supports, a deflector provided with means for clamping the tensioned member, means connecting the deflector to the arm intermediate the rotatable supports, a pair of springs secured to the frame and constituting a part of the deflector to provide the deflecting force therefore, a lever movable by the tensioned member and mounted intermediate the deflector and one of the rotatable supports for measuring the secondary camber of the tensioned member between said deflector and the last mentioned rotatable member, and a dial indicator having gearing responsive to movement of the deflector and the lever to indicate the correct tension in the tensioned member regardless of its stiffness.

9. A device for measuring forces acting upon a tensioned member comprising a frame provided with a pair of supports for engaging two points on the tensioned member, an arm pivoted to the frame adjacent one of the supports, a deflector provided with a relatively adjustable hook for confining the tensioned member against the body of the deflector, means connecting the deflector to the arm and to the frame, a lever movable by the tensioned member mounted intermediate the deflector and one of the supports for measuring the secondary camber of the tensioned member between said deflector and the last mentioned support and a geared dial indicator responsive to movement of the deflector and the lever to indicate the correct tension in the tensioned member regardless of its stiffness.

10. A device for measuring forces acting upon a tensioned member comprising a frame, resilient mechanism mounted upon the frame for deflecting a portion of the tensioned member, a movable member on the frame provided with an element for engaging the tensioned member at a point spaced from the point of engagement of the resilient mechanism therewith, a transmitting lever pivoted upon the movable member, a second transmitting lever similarly pivoted at a point nearer the tensioned member than the other lever, movement of one of the transmitting levers being controlled by said element, a geared dial indicator having an operative connection with the other transmitting lever and a link pivoted to the frame and provided with means for transmitting movement between the two transmitting levers.

11. A device for measuring forces acting upon a tensioned member comprising a frame, a resilient mechanism for deflecting a portion of the tensioned member, a movable member on the frame provided with a lever for engaging the tensioned member at a point spaced from the point of engagement of the resilient mechanism therewith, a transmitting lever pivoted upon the movable member, a second transmitting lever similarly pivoted at a point nearer the tensioned member than the other lever, movement of one transmitting lever being controlled by said element when the latter engages the tensioned member, a geared dial indicator having a cam engaging the other transmitting lever and a link pivoted to the frame and provided with means for transmitting movement between the transmitting levers.

12. A device for measuring forces acting upon a tensioned member comprising a frame, means on the frame for engaging portions of said member, a pair of leaf springs spaced in different planes in superposed relation, means for securing the springs to the frame, and means having operable connections to the springs and to the tensioned member for indicating the tensional forces acting on the latter.

13. A device for measuring forces acting upon a tensioned member comprising a frame, means on the frame for engaging portions of said member, a plurality of springs spaced in parallel superposed relation in different planes, means for rigidly securing the springs to the frame, and means having operable connections to the springs and to the tensioned member for indicating the tensional forces acting on the latter.

In witness whereof, I have hereunto signed my name.

WOLFGANG B. KLEMPERER.